US008618466B2

(12) United States Patent
Ehrenberg et al.

(10) Patent No.: US 8,618,466 B2
(45) Date of Patent: Dec. 31, 2013

(54) POSITION-MEASURING DEVICE HAVING A FIRST MEASURING STANDARD AND AT LEAST TWO MULTITURN CODE DISKS

(75) Inventors: Joern Ehrenberg, Traunstein (DE); Herman Meyer, Schneizlreuth (DE); Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 813 days.

(21) Appl. No.: 11/529,961

(22) Filed: Sep. 29, 2006

(65) Prior Publication Data

US 2007/0075232 A1 Apr. 5, 2007

(30) Foreign Application Priority Data

Oct. 1, 2005 (DE) ........................ 10 2005 047 258

(51) Int. Cl.
*G01D 5/34* (2006.01)
*G06M 7/00* (2006.01)

(52) U.S. Cl.
USPC ..................................... 250/231.15; 250/221

(58) Field of Classification Search
USPC ................ 250/231.13–231.18, 214 PR, 221; 341/11, 13, 14; 356/614–622; 359/436, 359/440–442; 33/1 R, 1 N, 1 M, 1 L, 1 SP, 33/1 PT See application file for complete search history.

(56) References Cited

U.S. PATENT DOCUMENTS

| 4,007,383 | A | * | 2/1977 | Wessner ..................... 250/237 G |
| 4,700,062 | A | * | 10/1987 | Ernst ......................... 250/231.18 |
| 5,428,445 | A | * | 6/1995 | Holzapfel ...................... 356/499 |
| 5,640,007 | A | * | 6/1997 | Talbott et al. ............. 250/231.15 |
| 6,285,024 | B1 | | 9/2001 | Pinnock ................... 250/231.13 |
| 7,087,889 | B2 | * | 8/2006 | Shiba ....................... 250/231.13 |
| 2007/0180714 | A1 | * | 8/2007 | Siraky .......................... 33/1 PT |

FOREIGN PATENT DOCUMENTS

| DE | 28 17 172 | | 10/1979 | |
| DE | 2817172 | * | 10/1979 | ............. H03K 13/18 |
| DE | 83 09 161 | | 9/1988 | |
| DE | 198 21 467 | | 11/1999 | |
| EP | 1 457 762 | | 9/2004 | |
| JP | 63-237616 | | 10/1988 | |
| JP | 11-132792 | | 5/1999 | |

OTHER PUBLICATIONS

European Search Report, dated Dec. 6, 2011, issued in corresponding European Patent Appln. No. 06014999.4.

* cited by examiner

*Primary Examiner* — Pascal M Bui Pho
(74) *Attorney, Agent, or Firm* — Kenyon & Kenyon LLP

(57) ABSTRACT

A position-measuring device for measuring linear and/or angular positions includes a first measuring standard that has a first code track, with the aid of which consecutive position regions are cyclically measurable, and at least two multiturn code disks having second code tracks, via whose angular positions the currently measured position region of the first code track may be determined. The first measuring standard and the multiturn code disks are positioned such that the first code track and the second code tracks are scannable by a common scanning unit, through a first scanning window and second scanning windows, respectively.

21 Claims, 3 Drawing Sheets

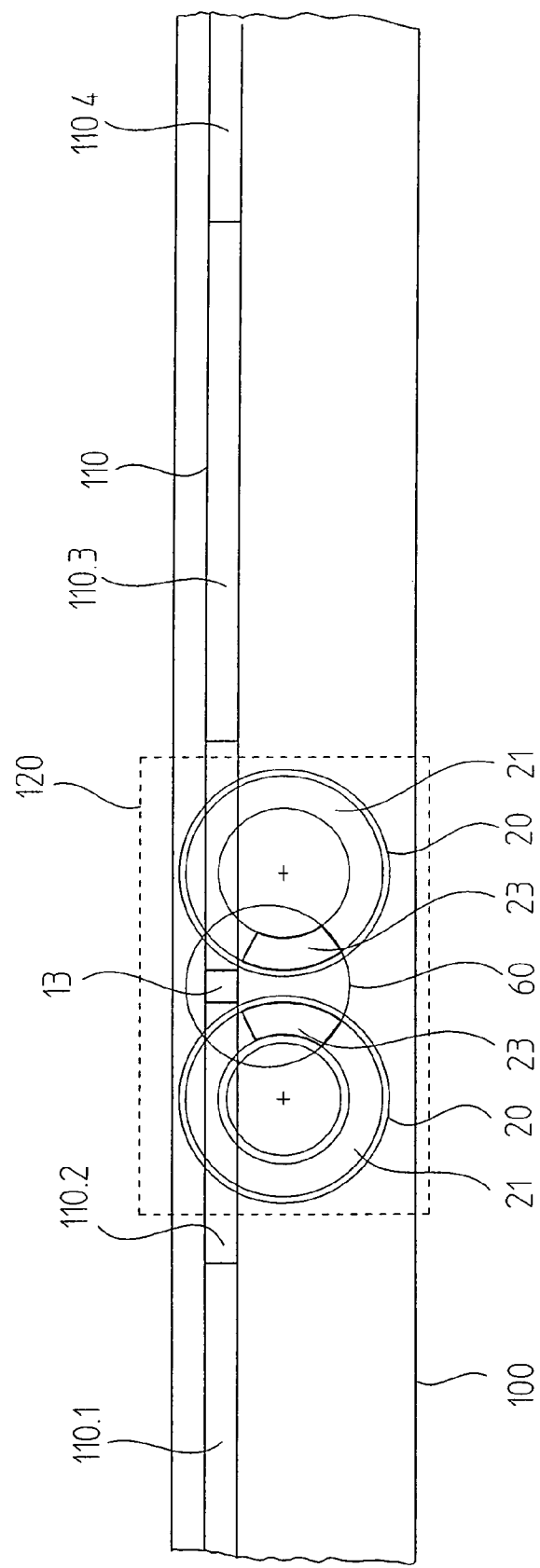

POSITION-MEASURING DEVICE HAVING A FIRST MEASURING STANDARD AND AT LEAST TWO MULTITURN CODE DISKS

CROSS-REFERENCE TO RELATED APPLICATIONS

The present application claims priority to Application No. 10 2005 047 258.3, filed in the Federal Republic of Germany on Oct. 1, 2005, which is expressly incorporated herein in its entirety by reference thereto.

FIELD OF THE INVENTION

The present invention relates to a position-measuring device for measuring, e.g., linear and/or angular positions.

BACKGROUND INFORMATION

Certain position-measuring devices are described in a number of documents. They are used for measuring lengths or angles in machines and devices. Such position-measuring devices include a measuring standard, on which one or more code tracks are applied, and a scanning unit, which scans the code tracks and converts path changes and angular changes into electrical signals. In the case of an angle-measuring device, the measuring standard may be a code disk, on which the code tracks are concentrically positioned. In the case of linear measuring devices, the measuring standard may take the form of a ruler.

In addition, certain conventional position-measuring devices, e.g., angle-measuring devices, include, in addition to the code disk for measuring the rotational angle of a shaft, further measuring standards in the form of further code disks, with the aid of which the number of completed revolutions is measured.

These additional code disks are driven via a reduction gear that reduces the speed of the shaft in a suitable manner. Such angle-measuring devices are also referred to as multiturn rotary transducers.

Certain linear measuring devices include rulers that are subdivided into several consecutive position segments, in which the coding of the code tracks cyclically repeats in the measuring direction. In order to count the passed position segments, one or more code disks are provided which are driven via a reduction gear during the scanning of the ruler, in a manner analogous to the multiturn rotary transducer.

Position-measuring devices, which include a plurality of measuring standards, require a complicated mechanical and electrical assembly, which results in high manufacturing costs. In this context, an important criterion is the scanning units for reading the code tracks of the individual measuring standards. In the case of optical scanning, for example, the scanning units include an illumination unit, whose light is modulated by the code track to be read, and a detector unit, which receives the modulated light and converts it into electrical position signals. If separate scanning units positioned to be spatially separated from one another are needed for scanning the individual measuring standards, then this has a considerable influence on the complexity of the position-measuring device.

An example of such a position-measuring device is described in German Published Patent Application No. 28 17 172. This relates to a multistage, shaft-angle encoder having a first angle-increment code disk and a plurality of succeeding angle-increment code disks. The code disks are arranged in two planes, the succeeding angle-increment code disks being together on one plane. All of the code disks are read separately at scanning locations spatially separated from one another. Therefore, a separate scanning unit in the form of a light source and photoelectric cells belonging to it is needed for each code disk. The required mechanical and electrical assembly is highly complex and cost-intensive.

Therefore, in order to achieve a simple and inexpensive design, the number of required scanning units may be reduced. Thus, Japanese Published Patent Application Nos. 11-132792 and 63-237616 describe absolute multiturn rotary transducers having a code disk for ascertaining the angular position of a shaft, as well as a further code disk for counting the completed revolutions of the shaft. The two code disks are connected via a reduction gear, and their code tracks are only scanned at one location. A disadvantage of these arrangements is that only one code disk is provided for counting the revolutions, which means that the number of countable revolutions is limited.

European Published Patent Application No. 1 457 762 describes a device for measuring the position, the displacement, or the rotational angle of an object. It includes three measuring standards in the form of three consecutive code disks, which are coupled via a differential gear unit. The code disks are scanned by a scanning unit that radially covers the code tracks of all of the code disks. However, this document only describes a device for counting run-through, measured-value cycles or position regions. There are no references to position measurement inside the position regions. Thus, it must be performed separately at another location and therefore requires an additional scanning unit.

SUMMARY

Example embodiments of the present invention may provide a position-measuring device having an arrangement for measuring standards that is improved over conventional devices.

A position-measuring device for measuring linear and/or angular positions includes: a first measuring standard having a first code track, with the aid of which consecutive position regions are cyclically measurable; and at least two multiturn code disks having second code tracks, via whose angular position the currently measured position region of the first code track may be determined. The first measuring standard and the at least two multiturn code disks are positioned so that the first code track and the second code tracks are scannable by a common scanning unit, through a first scanning window and second scanning windows, respectively.

The first measuring standard may include a single-turn code disk having a first code track, with the aid of which the angular position of a shaft may be measured. A complete revolution of the single-turn code disk corresponds to one position region. The number of completed revolutions of the shaft is ascertainable from the angular position of the two multiturn code disks.

It may be provided that the rotational axes of the multiturn code disks are inside the circumference of the single-turn code disk. The surfaces of the multiturn code disks may be completely inside the circumference of the single-turn code disk, in which case the radial extension of the arrangement becomes minimal.

The first measuring standard may be a ruler having a first code track, which includes consecutive position regions in the measuring direction, which are encoded in an absolute manner. The two multiturn code disks are located, together with the scanning unit, in a scanning head, which is movable along the ruler in the measuring direction. Consequently, scanning the first code track allows the position within the position region, at which the scanning head is currently located, to be measured. The second code disks are driven via a reduction gear, which is dimensioned so that the number of position regions passed by the scanning head is ascertainable from the angular position of the second code disks.

The rotational axes of the multiturn code disks, or the faces of the multiturn code disks, may be inside the circumference of the single-turn code disk.

A common illumination unit may be used in the scanning unit for scanning all of the code tracks, and an opto-ASIC may be used as a detector unit.

According to an example embodiment of the present invention, a position-measuring device for measuring at least one of (a) linear and (b) angular positions includes: a first measuring standard including a first code track with which consecutive position regions are cyclically measurable; and at least two multiturn code disks including second code tracks, a currently measured region of the first code track determinable from angular positions of the multiturn code disks. The first measuring standard and the multiturn code disks are positioned such that the first code track and the second code tracks are scannable by a common scanning unit respectively through a first scanning window and second scanning windows.

The first measuring standard may be arranged as a single-turn code disk connected to a shaft in a rotatably fixed manner, a position region may correspond to a complete revolution of the shaft, and a number of completed revolutions of the shaft may be measurable by the multiturn code disks.

The first code track of the single-turn code disk may be arranged in a single-turn measuring plane, the second code tracks of the multiturn code disks may be arranged side-by-side in a multiturn measuring plane, and the single-turn measuring plane and the multiturn measuring plane may be positioned in parallel with each other.

Rotational axes of the multiturn code disks may be positioned in parallel with a rotational axis of the shaft.

The rotational axes of the multiturn code disks may be positioned inside a circumference of the single-turn code disk.

Faces of the multiturn code disks may be positioned inside the circumference of the single-turn code disk.

The first measuring standard may be arranged as a ruler connected to a first object. The first code track may include code segments that: (a) follow each other in a measurement direction; (b) are encoded in an absolute manner; and (c) are assigned to position regions. The multiturn code disks and the scanning unit may be arranged in a scanning head connected to a second object, and a number of position regions passed by the scanning head may be measurable by the multiturn code disks.

The first code track of the ruler may be arranged in a ruler measuring plane, and the second code tracks of the multiturn code disks may be arranged side-by-side in a multiturn measuring plane. The ruler measuring plane and the multiturn measuring plane may be positioned in parallel with each other.

Rotational axes of the multiturn code disks may be positioned perpendicularly to the ruler measuring plane.

The rotational axes of the multiturn code disks may be arranged within the face of the ruler.

Faces of the multiturn code disks may be arranged within the face of the ruler.

The multiturn code disks may be formed of injection-molded plastic, and the second code tracks may be molded into the multiturn code disks.

The scanning unit may include an illumination unit and a detector unit, and scanning may be performable inside an illumination circle.

The detector unit may include an opto-ASIC.

According to an example embodiment of the present invention, a position-measuring device for measuring at least one of (a) linear and (b) angular positions includes: a first measuring standard including a first code track with which consecutive position regions are cyclically measurable; at least two multiturn code disks including second code tracks, a currently measured region of the first code track determinable from angular positions of the multiturn code disks; and a common scanning unit including a first scanning window and second scanning windows, the first measuring standard and the multiturn code disks positioned such that the first code track and the second code tracks are scannable by the common scanning unit respectively through the first scanning window and the second scanning windows.

Further features and aspects of example embodiments of the present invention are described in more detail below with reference to the appended Figures.

BRIEF DESCRIPTION OF THE DRAWINGS

FIG. 3 is a schematic view of a position-measuring device according to an example embodiment of the present invention.

DETAILED DESCRIPTION

Figure 1:
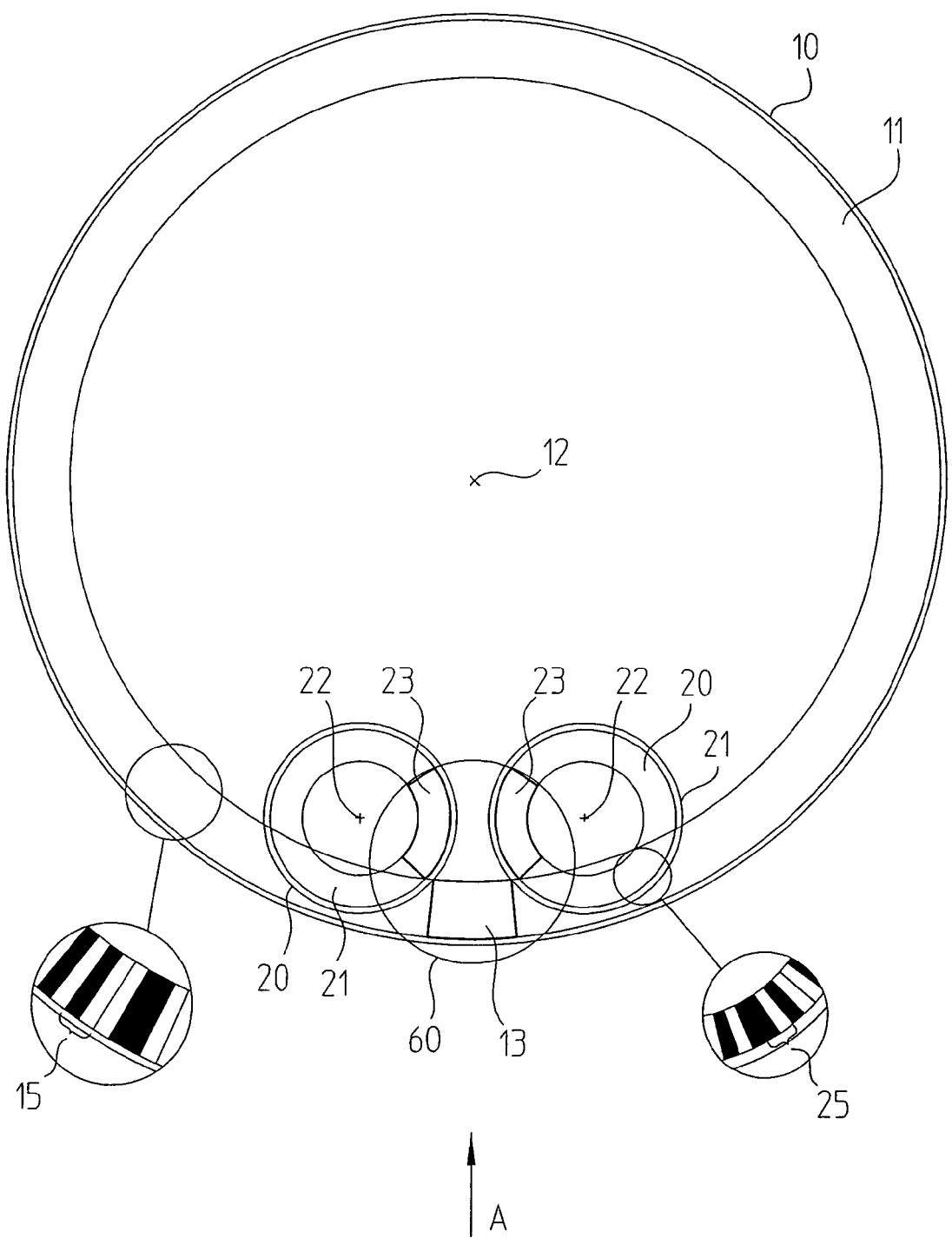
FIG. 1 is a schematic plan view of a position-measuring device according to an example embodiment of the present invention.

FIG. 1 is a schematic view of a position-measuring device according to an example embodiment of the present invention. It includes a first measuring standard in the form of a single-turn code disk 10, which is connected to a shaft 12 in a rotatably fixed manner. Arranged radially on single-turn code disk 10 with respect to the center point of shaft 12 is a first code track 11, with the aid of which the angular position of single-turn code disk 10 and, consequently, of shaft 12, may be measured. In this example, the position region, which is measurable with the aid of the first code track, therefore corresponds to a complete revolution of shaft 12. If shaft 12 is driven by a motor, for example, then the position region is cyclically scanned.

Two multiturn code disks 20 having second code tracks 21 are arranged above single-turn code disk 10. They are pivoted about their axes of rotation 22 and may be driven, for example, by shaft 12 via a reduction gear such that the number of completed revolutions of shaft 12 is ascertainable by combining the angular positions of multiturn code disks 20. Axes of rotation 22 are positioned in parallel with the rotational axis of shaft 12.

For clarity, a scanning unit is not shown in FIG. 1. Instead, the region in which the scanning of first code track 11 and second code tracks 21 occurs is denoted by an illumination circle 60. A first scanning window 13 for scanning first code track 11 and second scanning windows 23 for scanning second code tracks 21 are produced within illumination circle 60. Scanning windows 13, 23 illustrated in FIG. 1 are the maximum-sized ring segments, which are illuminated by illumination circle 60 and do not overlap.

The size actually used of scanning windows 13, 23 is a function of, e.g., the arrangement of code tracks 11, 21, e.g., how many code segments of code tracks 11, 21 are to be simultaneously scanned in order to obtain reliable position information. If, for example, first code track 11 has incremental scale graduation marking, e.g., an evenly spaced, radial graduation mark pattern, where the angular position of single-turn code disk 10 is determined by counting the graduation marks passing a detector, based on a reference mark, then only a small ring segment is needed for scanning window 13.

Code tracks encoded in an absolute manner are increasingly being used in position-measuring devices, since they avoid the disadvantage of incremental scale graduation marks, of initially having to approach a reference position after turn-on, before an absolute position value is available. So-called pseudorandom codes (PRC) are particularly suitable. PRCs include an irregular sequence of light-transmitting and opaque code segments, which are positioned over the circumference of the code track such that a different, unique, serial code word is generated for each angular step, and thus, the current angular position may be determined at any time.

The PRC may additionally include Manchester coding. If, in the PRC, a logical "1" is assigned a light-transmitting code segment and a logical "0" is assigned an opaque one, then the Manchester coding allows a logical "1" to be represented, for example, by a code segment, which, in the measuring direction, includes an opaque region, followed by a light-transmitting region. A logical "0" analogously includes a light-transmitting region, followed by an opaque one. It follows from this that bit sequences, which, in the case of a PRC, may include opaque code segments arranged side by side (e.g., "000" in the case of the above-described assignment), also have a transition from an opaque region to a light-transmitting region, or vice versa.

Since, for the scanning of pseudorandom codes, several consecutive code segments are to be simultaneously measured as a function of the width of the code word to be evaluated, larger scanning windows may be required.

In conventional combined code tracks, there may be incremental scale graduation marking in addition to, e.g., a track coded in an absolute manner, using a pseudo-random code having Manchester coding. Such code tracks are also usable in connection with example embodiments of the present invention.

As an example of code tracks including a PRC having Manchester coding, segments of first code track 11 and second code track 21 are illustrated enlarged in FIG. 1. In addition, e.g., a code segment 15 of first code track 11 and a code segment 25 of second code track 21 are illustrated.

Figure 2:
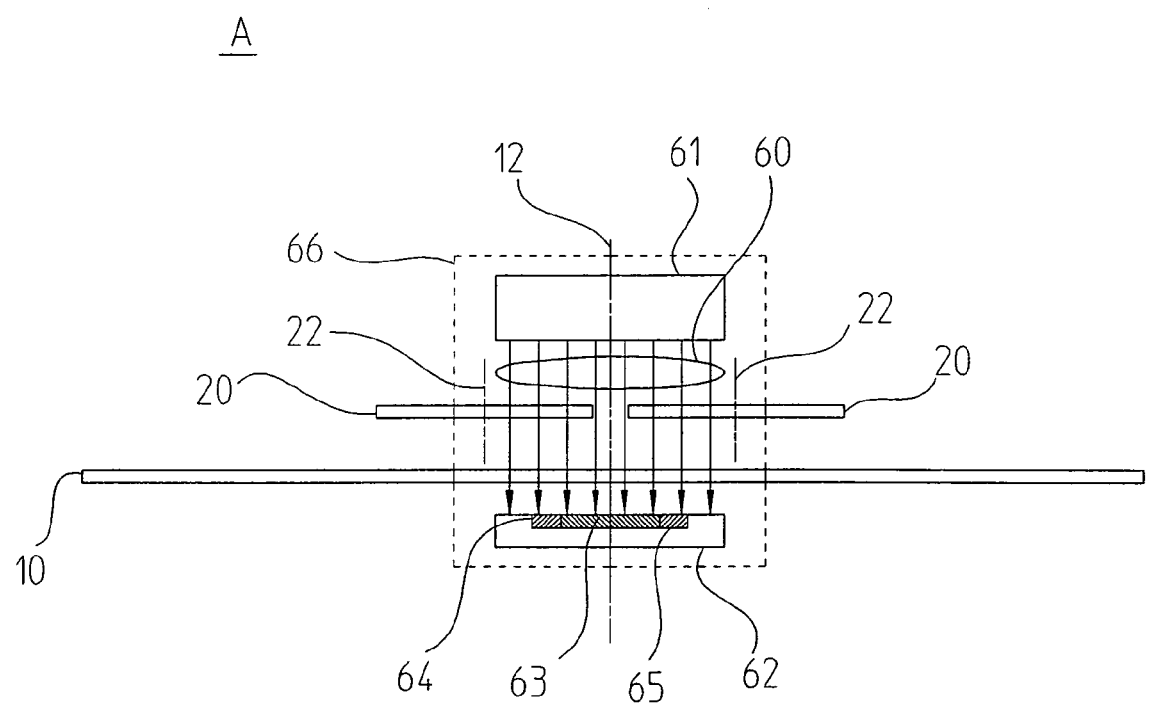
FIG. 2 is a side view of the device illustrated in FIG. 1.

FIG. 2 is a schematic side view of the position-measuring device illustrated in FIG. 1, from the direction indicated by arrow A. In addition to the components illustrated in FIG. 1, an illumination unit 61 and a detector unit 62 for scanning first code track 11 of single-turn code disk 10 and second code tracks 21 of the multiturn code disks are illustrated in FIG. 2. Therefore, illumination unit 61 and detector unit 62 form a scanning unit 66. Components of the position-measuring device described with reference to FIG. 1 are provided with the same reference numerals in FIG. 2.

The represented scanning principle is so-called transmitted-light scanning, e.g., the code disks are arranged between illumination unit 61 and detector unit 62. Illumination unit 61 directs a largely parallel bundle of light having the diameter of illumination circle 60, in the direction of the code disks. Depending on if it strikes light-transmitting or opaque code segments, the light is modulated by the code tracks and finally strikes sensor fields 63, 64, 65 of detector unit 62, which convert the modulated light to electric position signals and prepares it for further processing.

Illumination unit 61 may, for example, include a light-emitting diode, e.g., an infrared light-emitting diode, whose emitted light is parallelly aligned by a condenser lens. In order to be able to construct illumination unit 61 as simply as possible and attain a high illumination intensity, it may be provided to select the diameter of illumination circle 60 to be as small as possible. For example, the diameter may in the range of, e.g., less than 10 mm, and, e.g., less than 6.5 mm.

As illustrated in FIGS. 1 and 2, the light for scanning second code tracks 21 should also penetrate single-turn code disk 10. Therefore, in the region of scanning window 23, single-turn code disk 10 is formed of a light-transmitting material, for example, glass, a light-transmitting plastic, etc.

For the multiturn code disks, however, it may be provided that these disks are made of opaque, injection-molded plastic, since in this manufacturing method, the code tracks may be molded in (e.g., in a spoke-shaped manner, as a series of opaque bars and light-transmitting gaps, etc.) and teeth for driving the code disks via the reduction gear may be molded in, in one working step.

As illustrated in FIG. 2, multiturn code disks 20 are positioned side-by-side in one multiturn measuring plane, while single-turn code disk 10 is arranged in a single-turn measuring plane parallel to it. This arrangement is believed to be particularly favorable, since it allows a small gap between illumination unit 61 and detector unit 62. In this manner, the degree of modulation of the position signals, which are acquired by scanning second code tracks 21 of multiturn code disks 20 arranged in the multiturn measuring plane, is only negligibly affected. In addition, the required space is also reduced in the axial direction.

It should be noted that sensor fields 63, 64, 65 may be made up of not only individual sensor elements, but also groups of sensors positioned, for example, one behind the other in the measuring direction. The number and arrangement of the sensor elements is a function of the code track to be evaluated by sensor field 63, 64, 65. In the represented example, first sensor field 63 of detector unit 62 is assigned to first scanning window 13 and is therefore used for scanning first code track 11. Sensor fields 64 and 65 are analogously assigned to second scanning windows 23, e.g., they are used for scanning second code tracks 21.

Detector unit 62 may be not formed of many discrete components, such as individual photodiodes or photodiode arrays, but rather may be formed of a complex, application-oriented component. Such components are appropriately referred to as opto-ASICs. In addition to the photoelectric cells, they include circuits for processing the electric position signals acquired by the photoelectric cells from the received, modulated light. In addition, circuits for interpolating position signals and digitizing them, as well as interface modules for transmitting the position information to subsequent electronics, etc., may also be integrated as well. In the described exemplary embodiment, the use of an opto-ASIC as detector unit 62 allows the light modulated by first code track 11 and second code tracks 21 to be scanned and evaluated at only one location, and by only one component.

In the figures described above, the first measuring standard is described as being formed by single-turn code disk 10. However, FIG. 3 is a schematic view of a position-measuring device according to an example embodiment of the present invention, where the first measuring standard is a ruler 100. Components described above bear the same reference numerals and are not described in further detail. For clarity, scanning unit 66, which includes illumination unit 61 and detector unit 62, is not illustrated. Instead, scanning unit 66 is represented by illumination circle 60, similar as to FIG. 1.

A first code track 110 is applied to ruler 100, the first code track being subdivided into a plurality of code segments 110.1, 110.2, 110.3, 110.4, in which the coding of first code track 110 repeats in the measuring direction. Ruler 100 may be connected, for example, to a first object, while the scanning unit and multiturn code disks 20 are integrated in a scanning head 120, which is connected to a second object for measuring the travel path with respect to ruler 100. Code segments 110.1, 110.2, 110.3, 110.4 are therefore assigned position regions, which may be cyclically measured by scanning code segments 110.1, 110.2, 110.3, 110.4. For example, the first object may be the machining table of a machine tool, and the second object may be a tool slide. If scanning head 120 is moved along ruler 100 by the tool carriage, then code segments 110.1, 110.2, 110.3, 110.4 of first code track 110 are cyclically scanned, and thus, the current position within the position regions is measured.

When scanning head 120 is moved along ruler 100 in the measuring direction, multiturn code disks 20 are driven by ruler 100 via a reduction gear such that they count the number of code segments 110.1, 110.2, 110.3, 110.4 that scanning head 120 passes. The absolute position may be calculated from the distance traveled within code segments 110.1, 110.2, 110.3, 110.4 in which scanning head 120 is arranged, and from the number of passed code segments 110.1, 110.2, 110.3, 110.4. In order to drive the gear, teeth, for example, may be formed on ruler 100 in the measuring direction.

Multiturn code disks 20 are also positioned with respect to ruler 100 such that scanning windows for scanning the code tracks are produced inside of illumination circle 60, first code track 110 being scannable in first scanning window 13, and second code tracks 21 being scannable in second scanning windows 23. This produces the same advantages as described above.

Example embodiments of the present invention are not only suitable for transmitted-light scanning, but may also suitable for reflected-light scanning. In reflected-light scanning, an illumination unit and a detector unit are on one side of the code disks or the ruler, and the code tracks to be scanned include reflecting and non-reflecting code segments. In this context, light, which is emitted by the illumination unit in the direction of the code disks or the ruler, is diverted by the reflecting code segments of the code tracks in the direction of the detector unit and modulated in this manner.

What is claimed is:

1. A position-measuring device for measuring at least one of (a) linear and (b) angular positions, comprising:
   a first measuring standard including a first code track with which consecutive position regions are cyclically measurable; and
   at least two multiturn code disks including second code tracks, a currently measured region of the first code track determinable from angular positions of the multiturn code disks;
   wherein the first measuring standard and the multiturn code disks are positioned such that the first code track and the second code tracks are scannable by a single scanning unit having a single light emitter and a single detector unit, the first code track scannable by the illumination unit and the detector unit of the single scanning unit at a first scanning subregion, and each second code track scannable by the illumination unit and the detector unit of the single scanning unit at a respective second scanning subregion;
   wherein the first measuring standard is arranged as a single-turn code disk connected to a shaft in a rotatably fixed manner, a position region corresponding to a complete revolution of the shaft, a number of completed revolutions of the shaft measurable by the multiturn code disks; and
   wherein scanning of the first code track and the second code tracks by the illumination unit and the detector unit is performed inside of an illumination circle produced by the illumination unit.

2. The position-measuring device according to claim 1, wherein the first code track of the single-turn code disk is arranged in a single-turn measuring plane and the second code tracks of the multiturn code disks are arranged side-by-side in a multiturn measuring plane, the single-turn measuring plane and the multiturn measuring plane positioned in parallel with each other.

3. The position-measuring device according to claim 1, wherein rotational axes of the multiturn code disks are positioned in parallel with a rotational axis of the shaft.

4. The position-measuring device according to claim 3, wherein the rotational axes of the multiturn code disks are positioned inside a circumference of the single-turn code disk.

5. The position-measuring device according to claim 4, wherein faces of the multiturn code disks are positioned inside the circumference of the single-turn code disk.

6. The position-measuring device according to claim 1, wherein the multiturn code disks are formed of injection-molded plastic, the second code tracks molded into the multiturn code disks.

7. The position-measuring device according to claim 1, wherein the detector unit includes an opto-ASIC.

8. The position-measuring device according to claim 1, wherein the first scanning subregion does not overlap the second scanning subregions.

9. The position-measuring device according to claim 1, wherein the first scanning subregion and the second scanning subregions correspond to maximum-sized ring segments that are illuminated by the illumination circle and that do not overlap.

10. The position-measuring device according to claim 1, wherein the first and second scanning subregions are located in the illumination circle.

11. A position-measuring device for measuring at least one of (a) linear and (b) angular positions, comprising:
    a first measuring standard including a first code track with which consecutive position regions are cyclically measurable; and
    at least two multiturn code disks including second code tracks, a currently measured region of the first code track determinable from angular positions of the multiturn code disks;
    wherein the first measuring standard and the multiturn code disks are positioned such that the first code track and the second code tracks are scannable by a common scanning unit having an illumination unit and a detector unit, the first code track scannable by the illumination unit and the detector unit of the common scanning unit at a first scanning subregion, and each second code track scannable by the illumination unit and the detector unit of the common scanning unit at a respective second scanning subregion; and
    wherein the first measuring standard is arranged as a ruler connected to a first object, the first code track including code segments that follow each other in a measurement direction, that are encoded in an absolute manner, and that are assigned to position regions, the multiturn code disks and the scanning unit arranged in a scanning head connected to a second object, a number of position regions passed by the scanning head measurable by the multiturn code disks.

12. The position-measuring device according to claim 11, wherein the first code track of the ruler is arranged in a ruler measuring plane, and the second code tracks of the multiturn code disks are arranged side-by-side in a multiturn measuring plane, the ruler measuring plane and the multiturn measuring plane positioned in parallel with each other.

13. The position-measuring device according to claim 11, wherein rotational axes of the multiturn code disks are positioned perpendicularly to the ruler measuring plane.

14. The position-measuring device according to claim 13, wherein the rotational axes of the multiturn code disks are arranged within the face of the ruler.

15. The position-measuring device according to claim 14, wherein faces of the multiturn code disks are arranged within the face of the ruler.

16. The position-measuring device according to claim 11, wherein the multiturn code disks are formed of injection-molded plastic, the second code tracks molded into the multiturn code disks.

17. The position-measuring device according to claim 11, wherein scanning is performable inside an illumination circle.

18. The position-measuring device according to claim 11, wherein the detector unit includes an opto-ASIC.

19. A position-measuring device for measuring at least one of (a) linear and (b) angular positions, comprising:
    a first measuring standard including a first code track with which consecutive position regions are cyclically measurable;
    at least two multiturn code disks including second code tracks, a currently measured region of the first code track determinable from angular positions of the multiturn code disks; and
    a single scanning unit having a single light emitter and a single detection unit and including a first scanning subregion and second scanning subregions, the first measuring standard and the multiturn code disks positioned such that the first code track is scannable by the illumination unit and the detection unit of the single scanning unit at the first scanning subregion and the second code tracks are scannable by the illumination unit and the detection unit of the single scanning unit at respective second scanning subregions;
    wherein the first measuring standard is arranged as a single-turn code disk connected to a shaft in a rotatably fixed manner, a position region corresponding to a complete revolution of the shaft, a number of completed revolutions of the shaft measurable by the multiturn code disks; and
    wherein scanning of the first code track and the second code tracks by the illumination unit and the detector unit is performed inside of an illumination circle produced by the illumination unit.

20. The position-measuring device according to claim 19, wherein the first and second scanning subregions are located in the illumination circle.

21. A position-measuring device for measuring at least one of (a) linear and (b) angular positions, comprising:
    a first measuring standard including a first code track with which consecutive position regions are cyclically measurable;
    at least two multiturn code disks including second code tracks, a currently measured region of the first code track determinable from angular positions of the multiturn code disks; and
    a common scanning unit having an illumination unit and a detection unit and including a first scanning subregion and second scanning subregions, the first measuring standard and the multiturn code disks positioned such that the first code track is scannable by the illumination unit and the detection unit of the common scanning unit at the first scanning subregion and the second code tracks are scannable by the illumination unit and the detection unit of the common scanning unit at respective second scanning subregions;
    wherein the first measuring standard is arranged as a ruler connected to a first object, the first code track including code segments that follow each other in a measurement direction, that are encoded in an absolute manner, and that are assigned to position regions, the multiturn code disks and the scanning unit arranged in a scanning head connected to a second object, a number of position regions passed by the scanning head measurable by the multiturn code disks.

* * * * *